United States Patent [19]
Janitsch

[11] 4,195,724
[45] Apr. 1, 1980

[54] BELT ELEVATOR WITH STAGGERED EDGE ROLLERS

[75] Inventor: Anthony D. Janitsch, Belleville, Canada

[73] Assignee: Allis-Chalmers Canada Limited, Lachine, Canada

[21] Appl. No.: 757,680

[22] Filed: Jan. 7, 1977

Related U.S. Application Data

[63] Continuation-in-part of Ser. No. 702,633, Jul. 6, 1976, abandoned, which is a continuation of Ser. No. 564,432, Apr. 2, 1975, abandoned.

[51] Int. Cl.² .............................................. B65G 15/14
[52] U.S. Cl. .................................................. 198/626
[58] Field of Search ................ 198/604, 605, 626, 627

[56] References Cited

FOREIGN PATENT DOCUMENTS 1123345 9/1956 France ...................................... 198/626
35870 8/1954 Poland ...................................... 198/626

*Primary Examiner*—Joseph E. Valenza
*Attorney, Agent, or Firm*—Charles L. Schwab

[57] ABSTRACT

In a bulk material handling apparatus especially adapted for handling granular material a pair of flexible belts are arranged about drive and idler pulleys to provide a material receiving run of one belt, a substantially vertical run or section where the belts are in face-to-face contact for receiving and transporting the material therebetween, and an upper material delivery run where the material is discharged at a different level. In the change of elevation section, staggered rollers are provided to urge the edges of the belts into engagement with one another so as to substantially eliminate leakage or spillage of material from therebetween. The edges of the belts are stretched in following a sinuous path between the edge rollers thereby causing the confronting belt edges to firmly engage one another.

6 Claims, 3 Drawing Figures

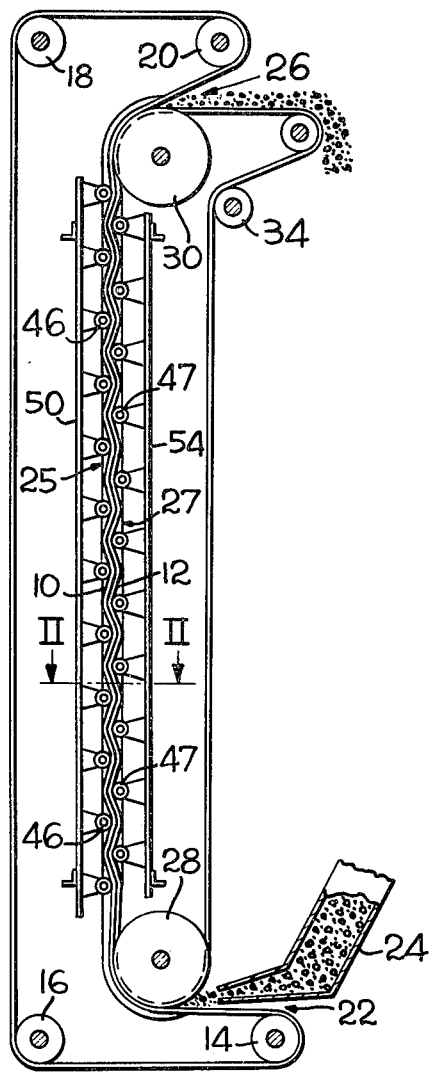
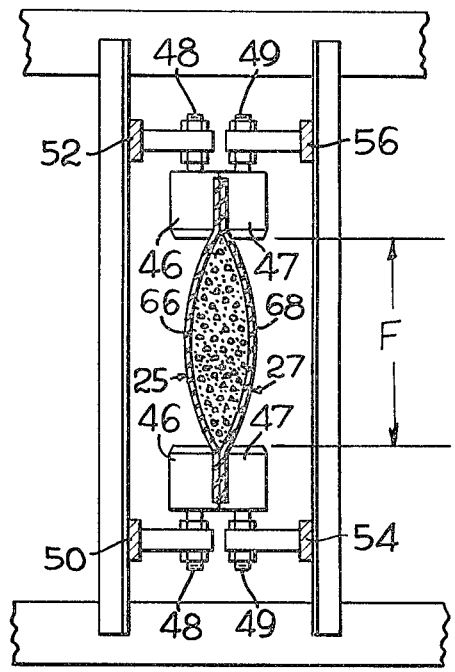
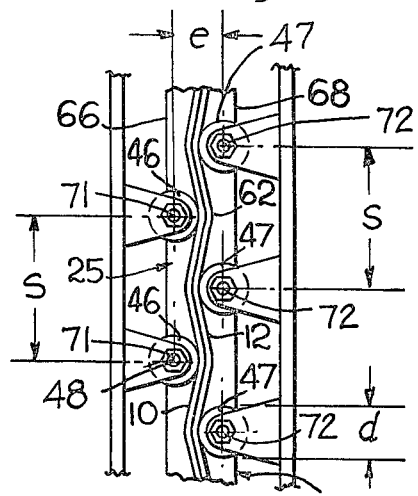

BELT ELEVATOR WITH STAGGERED EDGE ROLLERS

RELATED APPLICATIONS

This application is a continuation-in-part of my U.S. patent application Ser. No. 702,633 filed July 6, 1976, now abandoned, which was a continuation of my U.S. patent application Ser. No. 564,432 filed Apr. 2, 1975 for Belt Elevator with Staggered Edge Rollers, now abandoned.

BACKGROUND OF THE INVENTION

It is well known to elevate or lower bulk materials, including granular materials, between various levels by belt conveyors which face one another.

In some of these conveying apparatus, compressible foam, varying in compressibility from the side to the middle, is used, so as to provide edge-to-edge belt contact with the central portion of the belts in engagement with the material. While this arrangement may be satisfactory for discrete package handling, it has not been found satisfactory for handling granular material such as crushed rock or coal because of the fines present.

In order to overcome the problems just enumerated, the use of fluid pressure applied to the rear of the belts in the elevating section has been suggested, see U.S. Pat. No. 3,762,534. An improved conveyor wherein higher fluid pressures are applied to the edges (than to other parts of the belts) to maintain the edges in contact with one another is described and claimed in copending U.S. Pat. No. 3,948,383.

In French Pat. No. 1,123,345, edge rollers are employed to keep the edges of the belts in contact to substantially eliminate spillage and leakage.

THE INVENTION

According to this invention, there is provided in a bulk handling apparatus, especially adaptable to transport granular material between various levels, a pair of flexible belts having a change of elevation section in which the belts are in face-to-face relationship and staggered edge rollers in the change of elevation section insuring edge-to-edge belt contact to substantially eliminate spillage and leakage from therebetween.

The change of elevation section of the apparatus, i.e., that section which is disposed between two levels for transporting material therebetween, either from a lower to a higher level or vice versa, can be substantially vertically disposed or angularly inclined without departing from the spirit of the invention. The illustrated embodiment of this invention conveys bulk material from one level to another on a smooth, straight path so that the elevated material remains substantially in a vertical column form during elevation in the elevating zone. This minimizes power requirements and also tends to minimize bulk material loss because internal shifting movement of particles of bulk material is minimized.

THE DRAWINGS

FIG. 1 is a side elevation of a bulk material handling apparatus constructed according to this invention;

FIG. 2 is a sectional view taken on line II—II of FIG. 1; and

FIG. 3 is an enlarged view of the staggered edge rollers of the present invention.

DETAILED DESCRIPTION

FIG. 1 illustrates an apparatus for elevating bulk material, especially granular bulk material, which comprises a pair of endless, flexible belts 10 and 12 which have parts in face-to-face relationship in a change of elevation section between pulleys 28 and 30. The belt 10 is entrained over pulleys 14, 16, 18, and 20, the pulleys 14 and 16 being spaced from each other at the lower level and generally horizontally positioned, while the pulleys 18 and 20 are generally horizontally positioned and spaced from each other at the upper level. One or more of these pulleys may be driving pulleys. As illustrated the belt 10 has a substantially C-shaped configuration forming a substantially horizontal loading section 22 to receive bulk material from a chute 24 or similar device, a vertical elevating portion 25, and an upper portion which is angularly disposed to form a discharge section 26. In its installed condition the belt 10 is in tension to provide a predetermined tautness.

The belt 12 is entrained over pulleys 28, 30, 32 and 34, one or more of which may be driving pulleys. In any event, the belts 10 and 12 are driven at the same speed. The pulleys 28 and 30 are large pulleys which deflect the elevating portion 27 of the belt 12 into engagement with the elevating portion 25 of belt 10. The pulleys 30 and 32 are horizontally spaced from one another so that a belt discharge section 26 is formed and the pulley 34 is a snub pulley to maintain the belt 12 taut.

The belts 10 and 12 cooperatively engage one another between lower pulley 28 and upper pulley 30 to provide a change of elevation zone. In order to substantially eliminate spillage and leakage from the edges of the belts, there are provided a plurality of edge rollers 46, 47 which engage the edges of the belts in order to effectively maintain them in engagement with one another. As shown in FIGS. 1 and 2, the rollers 46 are mounted for rotation on parallel axes 71 by shafts 48 supported in brackets on vertical supports 50, 52. Likewise, shafts 49 rotatably support rollers 47 on parallel axes 72 and are mounted on brackets secured to vertical supports 54, 56. Inasmuch as the belts are driven, no power is generally required for the edge rollers 46, 47; however, if desired, the edge rollers 46, 47 can be power driven without departing from the spirit of the invention.

As illustrated in FIG. 3, the axes 71 are spaced a distance S from one another and the axes 72 are spaced the same distance S from one another. The edge rollers 46, 47 rotate on axes 71, 72 lying in two parallel vertical planes spaced a distance e from one another. The juxtaposed planes defined by the axes 71, 72, respectively, are oriented in the same face-to-face relationship as the associated belts 10, 12. That is, as viewed in the drawings, the plane through axes 71 is to the left of the plane through the axes 72, just as the belt 10 associated with rollers 46 is to the left of the belt 12 associated with rollers 47. The rollers 46, 47 are so positioned as to force the belt edges to stretch and follow a sinuous path between the two sets of rollers 46, 47. In FIG. 3, the sinuous path of the belt edges is evident. As the belts travel upwardly together between the rollers 46, 47, the belt edges are alternately displaced laterally (in relation to the direction of the belt) from one side to the other. The deflection of the belt edge by one roller 46 acting on the belt 10 in opposition to the two nearest staggered rollers 47 causes the edge of the belt 10 to assume a curve as predicted by the elastic beam theory. The portion 62 of the edge of the belt 12, because of its position on the outside of the curve, must assume a curve of greater radius than the confronting edge portion of belt 10 thereby stretching its edge. This produces a localized tension in portion 62 forcing it into sealing contact with the confronting edge of belt 10. The local tensions in the belt edges alternate from belt-to-belt as the belt edges pass between the rollers and effectively keep the belt edges in sealing engagement with sufficient force to virtually eliminate edge spillage of material being conveyed from one level to another. Although the staggered rollers 46, 47 cause the belt edges to follow a zig-zag course, the column of conveyed material compressed by the belts is relatively stiff and will not zig-zag but rather it will remain in column form and it, and the intermediate parts of the belts acting against the column, will move in a smooth path.

As the cross-section of material being conveyed changes, the central portions 66, 68 will bow or belly out more or less as the material cross-section requires. The changes in cross-section of material being elevated will cause the edges of the belts to move laterally in or out on the edge rollers. It will be noted that the edge rollers have smooth cylindrical rolling surfaces, thus readily permitting the belts to move laterally in-and-out as the elevated material cross-section changes. Accordingly, the cylindrical edge rollers and flat belt edges permit the dual belt elevator to convey a variable volume of bulk material.

In carrying out my invention I prefer certain parameters for size and relationship of various components. For instance I prefer to establish the distance e in inches between the two planes defined by the axes 71, 72, respectively, by the following formula:

$$e = t_1 + t_2 - (0.10 \pm 0.05)S$$

wherein; $t_1$ is the thickness in inches of belt 10, $t_2$ is the thickness in inches of belt 12, and S is the distance in inches between the axes of adjacent edge rollers at the back side of one of the belts 10, 12. Preferably $t_1$ equals $t_2$ and the spacing of rollers 46 is the same as the spacing of rollers 47. For most applications I believe $e = t_1 + t_2 - 0.05S$ to be a satisfactory maximum spacing. The spacing S between rollers will be at least equal to the diameter d of the rollers. The maximum spacing S in inches may be expressed by the formula:

$$S = 160ud/vFw$$

wherein: u is the coefficient of friction between the bulk material being conveyed and the belt, d is the diameter of the edge roller in inches, v is the density of the material being conveyed in pounds per square foot, F is the free width of the belt in inches (the width of the belt disposed between the laterally inner ends of the edge rollers) and w is a lump size constant for the bulk material being conveyed which varies from about 0.07 for lumpy material to about 0.2 for fine material.

I believe that for most applications the spacing interval S of 2 to 5 times the diameter d of the rollers will provide satisfactory results. A satisfactory belt elevator for handling bulk material can be provided by using edge rollers which are 2.5 inches in diameter, 3 inches in length and are spaced on axes 6 inches apart and by spacing the axes of the two series of edge rollers so as to define planes 2 inches apart.

I claim:

1. Bulk material handling apparatus especially adaptable for conveying a variable volume of granular material from one level to another comprising:
 a pair of flexible endless conveyor belts arranged to have the belts in a change of elevation zone in face-to-face relationship presenting flat belt edges in engagement with one another;
 drive means for moving the belts at the same speed; and
 mechanical means engaging the respective edges of the belts in said change of elevation zone to maintain said edges in abutting relationship and to thereby substantially eliminate spillage of material being transported from between said belts, said mechanical means including sets of edge rollers of predetermined diameter at each side of said belts engaging said edges of said belts in said change of elevation zone and serving as substantially the sole positioning and supporting means for said belts in said elevation zone, said rollers being staggered in respect to one another and positioned to cause said edges of said belts to follow a sinuous path as they pass between said rollers, the axes of said sets of rollers defining juxtaposed planes oriented in the same face-to-face relationship as the associated belts, each of said rollers having a smooth cylindrical peripheral surface in engagement with the flat edge of the confronting belt permitting the latter to move relative to said peripheral surface in laterally inward and outward directions as the cross-section of the material conveyed between the belts increases and decreases, respectively, said edge rollers of one set being spaced vertically at intervals in the range of 2 to 5 times the diameter of one of said edge rollers, the parts of said belts between said edges engaged by said edge rollers traveling in a smooth path in said elevation zone whereby said granular material is conveyed en masse in column form in said elevation zone.

2. The apparatus of claim 1 wherein the axes of said sets of edge rollers define planes spaced from one another a distance not greater than the sum of the thickness of the two belts less 0.05 times the spacing interval of said edge rollers.

3. The apparatus of claim 2 wherein said edge rollers have equal diameters and both sets of rollers are spaced at equal intervals.

4. Bulk material handling apparatus especially adaptable for conveying a variable volume of granular material from one level to another comprising:
 a pair of flexible endless conveyor belts arranged to have the belts in a change of elevation zone in face-to-face relationship presenting flat belt edges in engagement with one another;
 drive means for moving the belts at the same speed; and
 mechanical means engaging the respective edges of the belts in said change of elevation zone to maintain said edges in abutting relationship and to thereby substantially eliminate spillage of material being transported from between said belts, said mechanical means including sets of edge rollers of predetermined diameter at each side of said belts engaging said edges of said belts in said change of elevation zone and serving as substantially the sole positioning and supporting means for said belts in said elevation zone, said rollers being staggered in respect to one another and positioned to cause said edges of said belts to follow a sinuous path as they pass between said rollers, the axes of said sets of rollers defining juxtaposed planes oriented in the same face-to-face relationship as the associated belts, each of said rollers having a smooth cylindrical peripheral surface in engagement with the flat edge of the confronting belt permitting the latter to move relative to said peripheral surface in laterally inward and outward directions as the cross-section of the material conveyed between the belts increases and decreases, respectively, each of said sets of edge rollers being spaced vertically at no greater intervals than expressed in inches by the formula:

spacing $(S) = 160ud/vFw$ wherein:

u is the coefficient of friction between the bulk material being conveyed and the belt, d is the diameter of the edge roller in inches, v is the density of the material being conveyed in pounds per square foot, F is the free width of the belt in inches, and w is a lump size constant for the bulk material being conveyed, the parts of said belts between said edges engaged by said edge rollers traveling in a smooth path in said elevation zone whereby said granular material is conveyed en masse in column form in said elevation zone.

5. The apparatus of claim 4 wherein the axes of said sets of edge rollers define planes spaced from one another a distance not greater than the sum of the thickness of the two belts less 0.05 times the spacing interval of said edge rollers.

6. The apparatus of claim 5 wherein said edge rollers have equal diameters and both sets of rollers are spaced at equal intervals.

* * * * *